Nov. 4, 1952        J. HODGKINSON ET AL        2,616,238
                         HEDGE CUTTER
Filed May 26, 1949                          3 Sheets-Sheet 1

INVENTORS
John Hodgkinson
and
Hargreaves Roberts
BY
J. J. Victor Armstrong
ATTORNEY

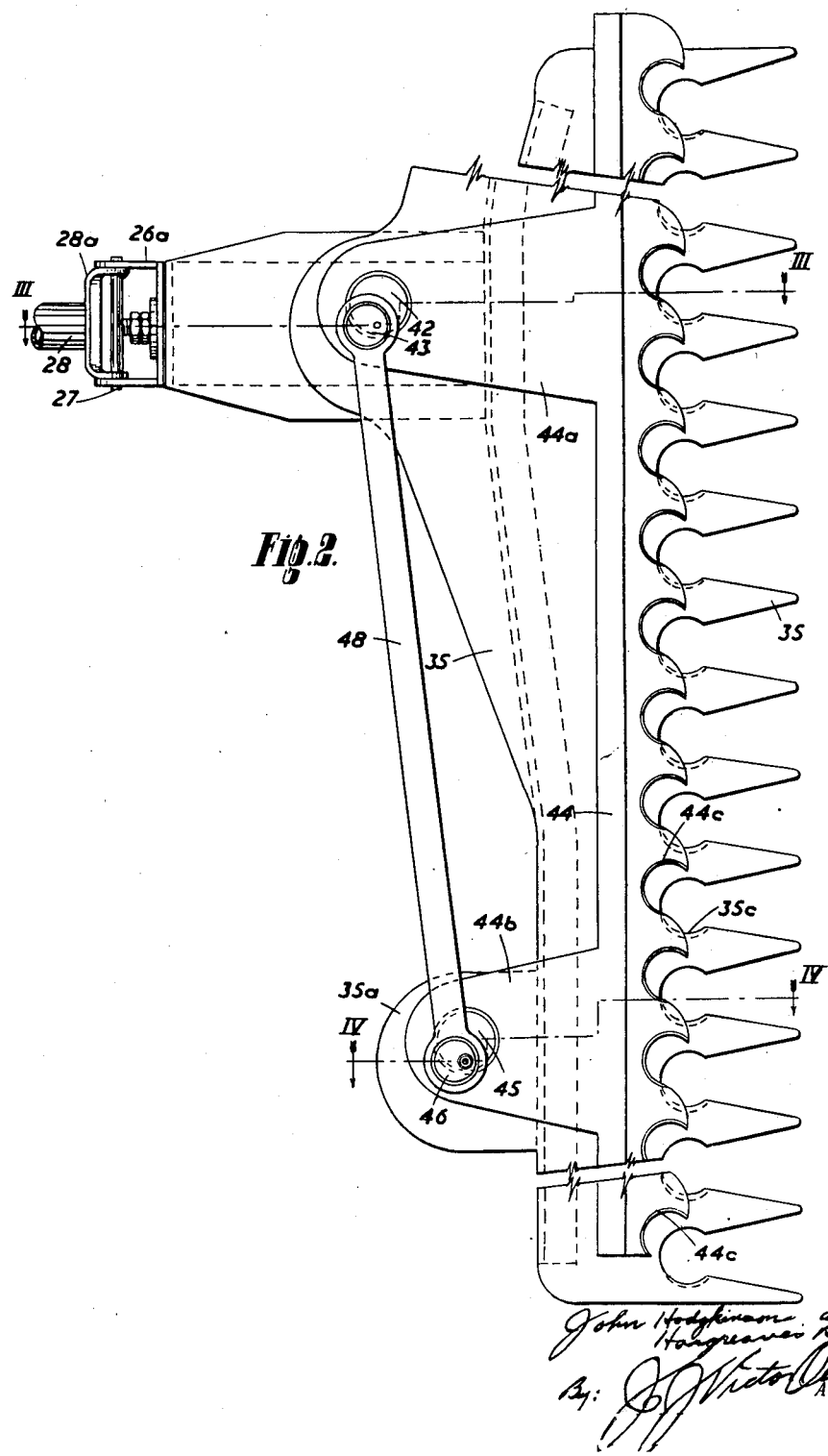

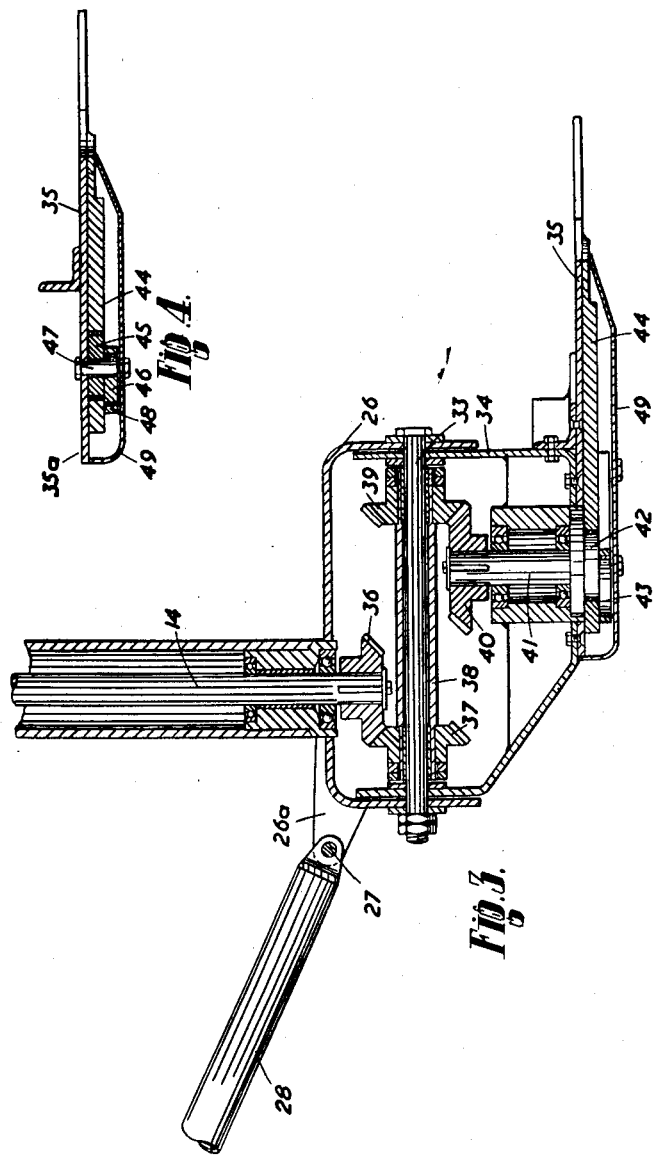

Patented Nov. 4, 1952

2,616,238

UNITED STATES PATENT OFFICE 2,616,238

HEDGE CUTTER

John Hodgkinson, Northop, and Hargreaves Roberts, Hawarden, North Wales

Application May 26, 1949, Serial No. 95,528
In Great Britain May 27, 1948

1 Claim. (Cl. 56—237)

This invention concerns hedge cutters of the type wherein relative movement is adapted to be effected between a first blade, having a plurality of teeth each presenting a cutting edge, and a second blade provided with abutment or cutting regions or edges for co-operation with the teeth of the first blade.

An object of this invention is to provide a hedge cutter of the type referred to which is especially suitable for being power driven and which will sever any hedge portion fully engaged by one of its teeth.

According to the present invention, a first blade of the hedge cutter is fixed relative to a support during operation and the other blade arranged to perform, relatively to the first, an irrotational motion such that it moves continuously parallel to itself, and each point upon it periodically describes a closed curve.

Preferably, in operation one blade is fixed relative to a support such as a tractor and every point on the moving blade describes a circle. In this case the motion is conveniently transmitted by a pair of spaced eccentrics each housed in the moving blade.

In one preferred embodiment a driving shaft drives one of the said eccentrics and the other said eccentric rotates on an idler spindle. Drive is transmitted from the driving shaft to the second mentioned eccentric by means of a connecting rod which couples a further pair of eccentrics, one of which is on the driving shaft and the other on the idler spindle.

The amplitude, in the direction of the length of the blades, of the relative movement between said blades is preferably such that at one part of the motion a tooth on the moving blade provides, with a tooth on the stationary blade, an aperture for reception of part of the hedge, said aperture being adapted to be completely closed at another part of the motion.

The co-operating teeth of the blades are preferably curved in opposite senses, the cutting edges of the teeth on the moving blade being concave in the direction of the cutting stroke. By this means a slicing action is obtained which is of value in obtaining efficient cutting.

For agricultural and similar uses, where large areas of hedge surface have to be cut, a large size cutter is used, driven usually by a tractor. For this type of cutter a blade length of about 4' 6" is suitable. Much smaller cutters are however also useful (e. g. for performing cutting in confined spaces). Such smaller cutters are conveniently power driven by an electric motor. These cutters may be used for grass cutting etc., as well as hedge cutting.

The invention will be described further, by way of example, with reference to the accompanying drawings in which—

Fig. 2 is an enlarged fragmentary plan view of one form of cutter (with cover plate removed for the sake of clarity);

Fig. 3 is a section on the line III—III of Fig. 2 showing details of the cutter gearbox; and Fig. 4 is a section on the line IV—IV of Fig. 2.

Figure 1:
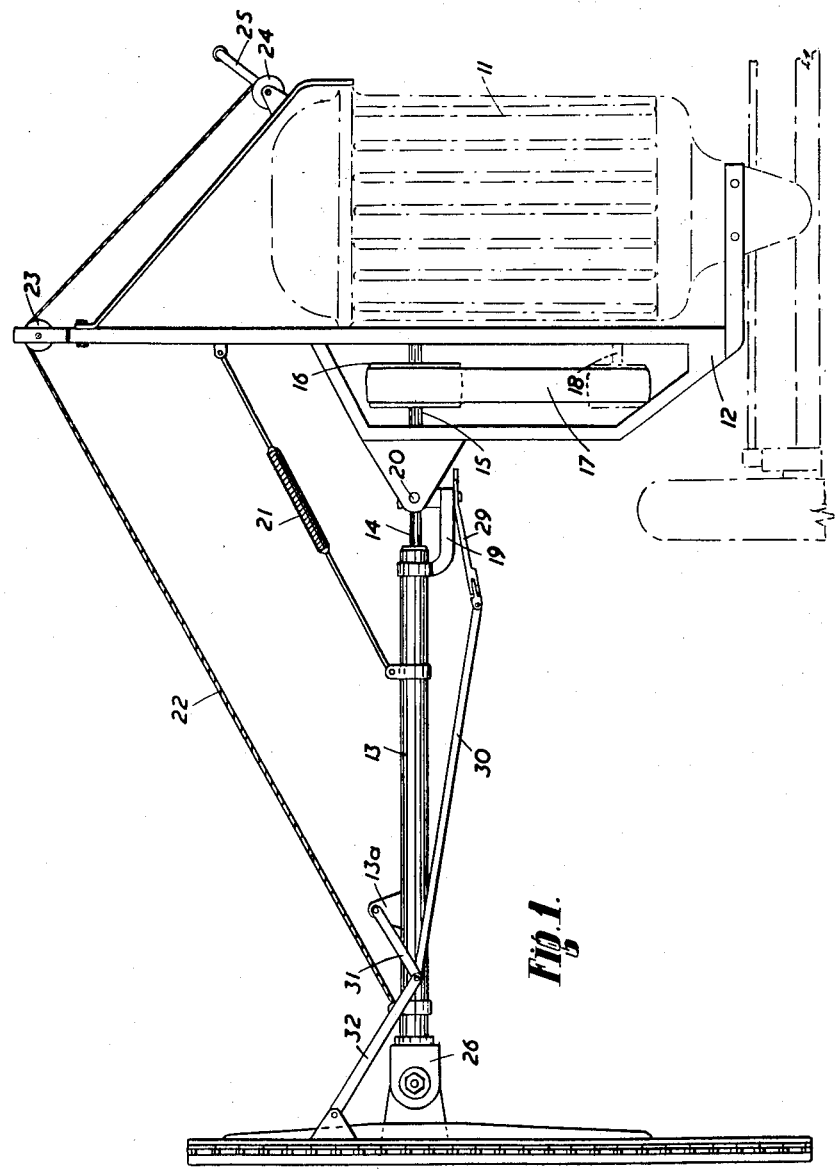
Fig. 1 is a front elevation showing a tractor with drive mechanism and an associated hedge cutter arranged for trimming vertically extending hedge faces.

A tractor generally designated 11 has an attached support frame 12. A tube 13 constitutes a housing for a shaft 14 which is connected to a shaft 15, journalled in the frame 12, by way of a universal joint (not shown). The shaft 15 carries a pulley 16 which can be driven by a belt 17 from a power take-off shaft 18 of the tractor.

The tube 13 is fixed to a yoke bracket 19 which is pivoted on pins 20 mounted in the frame 12.

A tension spring 21 extends between a bracket on the tube 13 and a lug on the frame 12, and serves partially to support the weight of the tube 13 and parts carried thereby. A wire rope 22 has one of its ends attached to a bracket on the tube 13 near the end thereof remote from the tractor and passes over a pulley 23 on the frame 12 and thereafter to a drum or winch 24 adapted to be rotated by a handle 25 disposed near the driving seat of the tractor and connected to the drum by a longitudinally extending spindle (not shown). There is a ratchet arrangement associated with the drum whereby on displacing the spindle longitudinally against spring action the drum becomes free to revolve under influence of tension in the rope. Thus the handle may be turned in one direction to wind up the rope and thereby raise the tube 13 to a desired position in which it is retained by the ratchet; whilst lowering of the tube is effected after disengaging the ratchet by using the handle to control the movement of the drum in the direction of unwinding.

The end of the tube 13 remote from the tractor is attached to a gearbox cover 26. This cover has two lugs 26a (Figs. 2 and 3) carrying a pin 27 on which a fork end 28a of a strut 28 is swingably mounted. The strut is pivotally connected at its rearward end to a rearward point on the tractor.

A lever (not shown) disposed so as to be accessible from the driving seat of the tractor has a locking arrangement such as a quadrant anchorage and is connected to the rearward end of a longitudinally extending link bar (not shown). The forward end of this link bar is connected pivotally to a transversely extending arm of a bell-crank lever 29. A forwardly extending arm of the lever 29 is pivotally connected to one end of a link bar 30 of which the other end is pivotally connected to one end of a radius bar 31 and to one end of a link bar 32 respectively. The other end of the radius bar is pivotally connected to a lug 13a on the tube 13. The gearbox cover 26 carries a pin 33 (Fig. 3) extending therethrough. A gearbox casing 34 is swingably mounted relative to the gearbox cover on the pin 33 and is attached to a fixed cutter blade 35. The other end of the link bar 32 is pivotally connected to a lug on the blade 35.

By varying the position of the hand lever, connected by way of the bell-crank lever 29 and link bars 30 and 32 to the blade 35, the inclination of the blade 35 relative to the tube 13 may be adjusted.

The shaft 14 has a pinion 36 attached at its end which projects with the gearbox cover. This pinion is enmeshed with a pinion 37 fixed near one of a sleeve 38 mounted for rotation on the pin 33. A pinion 39 fixed near the other end of the sleeve meshes with a pinion 40 fixed to a short shaft 41 which is journalled within the gearbox casing. This shaft 41 carries a first circular eccentric 42 and a second circular eccentric 43.

A moving blade 44 (Fig. 2) has two lugs 44a and 44b having circular apertures therein. The aperture in the lug 44a is engaged on the eccentric 42 and the lug 44b is engaged on a third circular eccentric 45 which, with a fourth circular eccentric 46, is mounted for rotation on a spindle 47 anchored in a lug 35a on the fixed blade 35. The fourth eccentric 46 is fixed to the third eccentric 45 in such a manner that the phase angle between these eccentrics is precisely the same as that between the eccentrics 43 and 42. A connecting rod 48 operatively interconnects the eccentrics 43 and 46.

A cover plate 49 (Fig. 4) encloses the eccentrics and the connecting rod and the major portion of the moving blade, and is attached to the fixed blade by way of the spindle 47 and one or more studs (not shown) passing through clearance apertures in the moving blade and anchored in the fixed blade.

The fixed blade 35 has a plurality of regularly spaced cutting teeth 35c, and the moving blade 44 has an equal number of correspondingly spaced cutting teeth or abutment regions 44c. The profile of each tooth 35c is concave in the final direction of the cutting stroke, whilst the profile of each tooth 44c is concave in the other direction.

In operation rotary motion is transmitted by way of the shafts 15 and 14, pinions 36 and 37, the sleeve 38, pinions 39 and 40 to the shaft 41 and thence to the eccentrics 42 and 43. Rotation of these eccentrics imparts motion to the moving blade 44 and to the connecting rod 48 causing rotation of the eccentrics 45 and 46 on the spindle 47. Thus the blade 44 is caused to move always parallel with itself, each point on the blade describing a circle.

Clearly, when the tractor 11 moves, the blade 35 also moves. The term "fixed blade" used in relation to the blade 35 does not mean that the blade is absolutely fixed in space, but that, for a given position of the lever and link controlling mechanism, it is fixed relative to the tractor, to the drive shaft and to the gear box, whilst the blade 44 moves in a circular motion relative to these elements. In the claim the term "fixed blade" is used in this sense.

We claim:

A hedge cutter comprising a first toothed blade fixed relatively to a support, a pair of spaced cylindrical housings in said first blade, a driving shaft running in one housing and an idler spindle housed in the other housing, two circular eccentrics mounted on the driving shaft, the centres of said circular eccentrics being at a certain angle to each other with respect to the axis of the driving shaft, two corresponding eccentrics mounted on the idler spindle and having their centres at substantially the same angle to each other, a second toothed blade which houses one of the eccentrics on the driving shaft and the corresponding eccentric on the idler spindle, a connecting rod which couples the other two eccentrics so that the line joining the centres of the two eccentrics mounted on the idler spindle is kept substantially parallel to the line joining the centres of the two eccentrics on the driving shaft in all positions of said driving shaft, and means to transmit drive to said driving shaft, whereby the second blade is caused to perform, relative to the first blade, a motion such that every point on it describes a circle, all the teeth on said second blade being concave in the direction of the cutting stroke and all the teeth on the fixed blade being concave in the opposite direction, said blades being arranged so that there is a gap between a tooth on one blade and a corresponding tooth on the other blade at one part of the motion and so that said gap is completely closed at another part of the motion.

JOHN HODGKINSON.
HARGREAVES ROBERTS.

REFERENCES CITED

The following references are of record in the file of this patent:

UNITED STATES PATENTS

| Number | Name | Date |
|---|---|---|
| 10,258 | Pierpoint | Nov. 22, 1853 |
| 19,319 | Van Duzer | Feb. 9, 1858 |
| 24,613 | Butler | July 5, 1859 |
| 335,397 | Taylor | Feb. 2, 1886 |
| 415,365 | Monday | Nov. 19, 1889 |
| 421,024 | Bechtol et al. | Feb. 11, 1890 |
| 499,967 | Case | June 20, 1893 |
| 1,989,821 | Peterson | Feb. 5, 1935 |
| 2,172,786 | Bishir | Sept. 12, 1939 |